United States Patent
Ni et al.

(10) Patent No.: US 11,131,767 B2
(45) Date of Patent: Sep. 28, 2021

(54) SYNTHETIC APERTURE RADAR MAPPING AND REGISTRATION SYSTEMS AND METHODS

(71) Applicant: The Boeing Company, Chicago, IL (US)

(72) Inventors: Kang-Yu Ni, Calabasas, CA (US); Shankar Rao, Agoura Hills, CA (US); Brian Limketkai, Santa Monica, CA (US)

(73) Assignee: The Boeing Company, Chicago, IL (US)

( * ) Notice: Subject to any disclaimer, the term of this patent is extended or adjusted under 35 U.S.C. 154(b) by 499 days.

(21) Appl. No.: 15/630,690

(22) Filed: Jun. 22, 2017

(65) Prior Publication Data

US 2018/0372862 A1    Dec. 27, 2018

(51) Int. Cl.
*G01S 13/90* (2006.01)
(52) U.S. Cl.
CPC ................... *G01S 13/9052* (2019.05)
(58) Field of Classification Search
CPC ............... G01S 13/90; G01S 13/9052
USPC ........................................................ 342/25 A
See application file for complete search history.

(56) References Cited

U.S. PATENT DOCUMENTS

| | | | |
|---|---|---|---|
| 5,424,742 A | 6/1995 | Long et al. | |
| 5,430,445 A | 7/1995 | Peregrim et al. | |
| 5,768,406 A * | 6/1998 | Abdel-Mottaleb | G06K 9/38 382/132 |
| 6,362,775 B1 * | 3/2002 | Goebel | G01S 13/06 342/175 |
| 7,245,250 B1 * | 7/2007 | Kalayeh | G01S 13/9017 342/25 R |
| 8,994,577 B1 * | 3/2015 | Bielek | G01S 13/904 342/25 F |
| 2003/0132875 A1 * | 7/2003 | Goebel | G01S 13/9023 342/25 R |
| 2003/0193335 A1 * | 10/2003 | Patch | G01R 33/565 324/307 |

(Continued)

FOREIGN PATENT DOCUMENTS

GB    2504051    1/2014

OTHER PUBLICATIONS

Fuller, Dane F., "Phase History Decomposition for Efficient Scatterer Classification in SAR Imagery", Department of the Air Force Air University, Sep. 15, 2011, 194 pages, Air Force Institute of Technology, Wright-Patterson Air Force Base, Ohio.

(Continued)

*Primary Examiner* — Timothy A Brainard
(74) *Attorney, Agent, or Firm* — Haynes and Boone, LLP

(57) ABSTRACT

Systems and methods according to one or more embodiments are provided for mapping and registration of synthetic aperture raw radar data to aid in SAR-based navigation. In one example, a SAR-based navigation system includes a memory including executable instructions and a processor adapted to receive phase history data associated with observation views of a scene. The processor further converts the received phase history data associated with the observation views to a range profile of the scene. The range profile is compared to a range profile template of the scene to estimate a geometric transformation of the scene encoded in the received phase history data with respect to a reference template.

20 Claims, 5 Drawing Sheets

(56) References Cited

U.S. PATENT DOCUMENTS

| | | | |
|---|---|---|---|
| 2005/0212692 A1* | 9/2005 | Iny | G01S 13/765 342/42 |
| 2006/0109162 A1* | 5/2006 | Krikorian | G01S 13/9019 342/25 B |
| 2010/0045513 A1* | 2/2010 | Pett | G01S 13/9023 342/25 C |
| 2010/0066586 A1* | 3/2010 | Liu | G01S 13/34 342/33 |
| 2010/0067806 A1* | 3/2010 | Shutt | G06K 9/00214 382/217 |
| 2011/0222781 A1 | 9/2011 | Nguyen et al. | |
| 2013/0280798 A1* | 10/2013 | Takesue | G01S 17/36 435/288.7 |
| 2014/0226859 A1* | 8/2014 | Bharath | G06K 9/00268 382/103 |
| 2015/0249509 A2* | 9/2015 | Linn | H04L 27/3818 375/227 |
| 2015/0323666 A1* | 11/2015 | Murata | G01S 13/9023 342/25 C |
| 2017/0016979 A1* | 1/2017 | Oho | G01S 13/90 |

OTHER PUBLICATIONS

Payne, Tim, "Pre-formation SAR to SAR image registration", Geoscience and Remote Sensing Symposium International, Jul. 9-13, 2001, pp. 3033-3035, IEEE, Piscataway, New Jersey.

Varshney et al., "Sparse Representation in Structured Dictionaries With Application to Synthetic Aperture Radar", Transactions on Signal Processing, Aug. 2008, pp. 3548-3561, vol. 56, No. 8, IEEE, Piscataway, New Jersey.

Gerry et al., "A Parametric Model for Synthetic Aperture Radar Measurements", Transactions on Antennas and Propagation, Jul. 1999, pp. 1179-1188, vol. 47, No. 7, IEEE, Piscataway, New Jersey.

Potter et al., "Attributed Scattering Centers for SAR ATR", Transactions on Image Processing, Jan. 1997, pp. 79-91, vol. 6, No. 1, IEEE, Piscataway, New Jersey.

Keller, Joseph B., "Geometrical Theory of Diffraction*", Journal of the Optical Society of America, Feb. 1962, pp. 116-130, vol. 52, No. 2, The Optical Society, Washington, D.C.

Suri et al, "Modifications in the SIFT operator for effective SAR image matching", International Journal of Image and Data Fusion, Sep. 2010, pp. 243-256, vol. 1, No. 3, Taylor & Francis Group, United Kingdom.

Wessel et al., "Registration of Near Real-Time SAR Images by Image-to-Image Matching", Photogrammetric Image Analysis, Sep. 19-21, 2007, pp. 179-184, vol. 36, International Archives of Photogrammetry, Remote Sensing and Spatial Information Sciences, Copernicus GmbH, Göttingen, Germany.

Lowe, David G., "Distinctive Image Features from Scale-Invariant Keypoints", International Journal of Computer Vision, Jan. 5, 2004, pp. 1-28, vol. 60, Issue 2, Kluwer Academic Publishers Hingham, MA.

Tang et al., "A New Local Feature Descriptor for SAR Image Matching", Progress in Electromagnetics Research Symposium Proceedings, Aug. 25-28, 2014, pp. 1823-1827, PIERS, Guangzhou, China.

Shan-Hu et al., "An Automatic Method for Finding Matches in SAR Images Based on Coarser Scale Bilateral Filtering SIFT", Journal of Electronics & Information Technology, Feb. 2012, pp. 287-293, vol. 34, No. 2, Institute of Electronics, Chinese Academy of Sciences, Beijing, China.

\* cited by examiner

SYNTHETIC APERTURE RADAR MAPPING AND REGISTRATION SYSTEMS AND METHODS

TECHNICAL FIELD

One or more embodiments relate generally to Synthetic Aperture Radar (SAR) mapping and registration, and more particularly, for example, to techniques for range profile based SAR mapping and registration.

BACKGROUND

In the field of synthetic aperture radar (SAR) based navigation systems, there is an ongoing effort to reduce computational complexity and resources required, particularly on autonomous platforms with limited computational power. In some global positioning system (GPS) denied environments, navigation guidance is provided by SAR imagery. Conventional SAR imagery navigation systems apply techniques developed in image processing for matching and registration of processed SAR images of a scene to expected ground landmarks of the same scene. Contemporary SAR based navigation methods require extensive processing and data resources for SAR image reconstruction and feature detection. Thus, there is a need for improved techniques for synthetic aperture (SAR) based navigation on platforms, such as for example for systems with limited computational power and resources.

SUMMARY

Systems and methods are disclosed herein in accordance with one or more embodiments that provide techniques for matching and registration of SAR radar phase history data, for example, to estimate geometric transformations of the data with respect to reference templates in order to provide navigation guidance. In one or more embodiments, SAR phase history data of a scene is converted to a range profile domain and compared to a range profile of a template of the same scene to provide for efficient SAR-based navigation.

In one embodiment, a method includes receiving phase history data associated with observation views of a scene; converting the received phase history data associated with the observation views to a range profile of the scene; and comparing the range profile to a range profile template of the scene to estimate a geometric transformation of the scene encoded in the received phase history data with respect to a reference template.

In another embodiment, a method includes retrieving phase history template data of a scene from a memory; converting the phase history template data to a range profile template of the scene; and storing the range profile template of the scene to the memory.

In a further embodiment, a system includes a memory comprising a plurality of executable instructions; and a processor adapted to: receive phase history data associated with observation views of a scene; convert the received phase history data associated with the observation views to a range profile of the scene; and compare the range profile to a range profile template of the scene to estimate a geometric transformation of the scene encoded in the received phase history data with respect to a reference template.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Systems and methods are provided for matching and registration of synthetic aperture radar (SAR) phase history data of a scene with a pre-stored template of the same scene to furnish navigation guidance information, for example, in accordance with one or more embodiments. In a GPS denied environment, a drone, a fixed wing craft, a spacecraft, or other type of unmanned or manned vehicle rely on SAR-based imaging to provide for navigation.

In one or more embodiments described herein, navigation techniques are described that reduce the computation, memory, and transmission bandwidth required of conventional SAR-based navigation systems. For example, conventional SAR image navigation techniques often match salient features in multiple SAR images that can be easily detected and matched. Constructing multiple SAR images to use for such navigation techniques requires extensive computation resources, memory, and transmission bandwidth.

In an illustrated embodiment, the systems and methods described herein rely on raw received phase history data from multiple views of a scene. Received phase history data from one or more views of the scene is converted to the range profile domain. Phase history data of a SAR template (e.g., a reference template) of the same scene is similarly converted to the range profile domain. A rotation angle and a translation of the observed radar phase history data are estimated and the observed radar phase history data is matched to the template of the same scene using the estimated rotation angle and translation to facilitate SAR-based navigation.

An algorithm is used to find the rotation angle and translation between a SAR phase history template and received radar phase history by converting both to the range profile domain. In some embodiments, the received radar phase history data is under-sampled, and the phase history template data is under-sampled to match by selecting one or more subsets of rows that correspond to observation views sampled in the received phase history data. A rotation angle is estimated by using the received radar under-sampled phase history data with matched filtering and Wasserstein distance computations. A translation value is estimated by first finding row shifts for each observation view (e.g., viewed at an observation angle relative to a flight path of an aerial vehicle) with matched filtering, and utilizing the row shifts and a system of linear equations with least squares equations to solve for the translation value.

Figure 1:
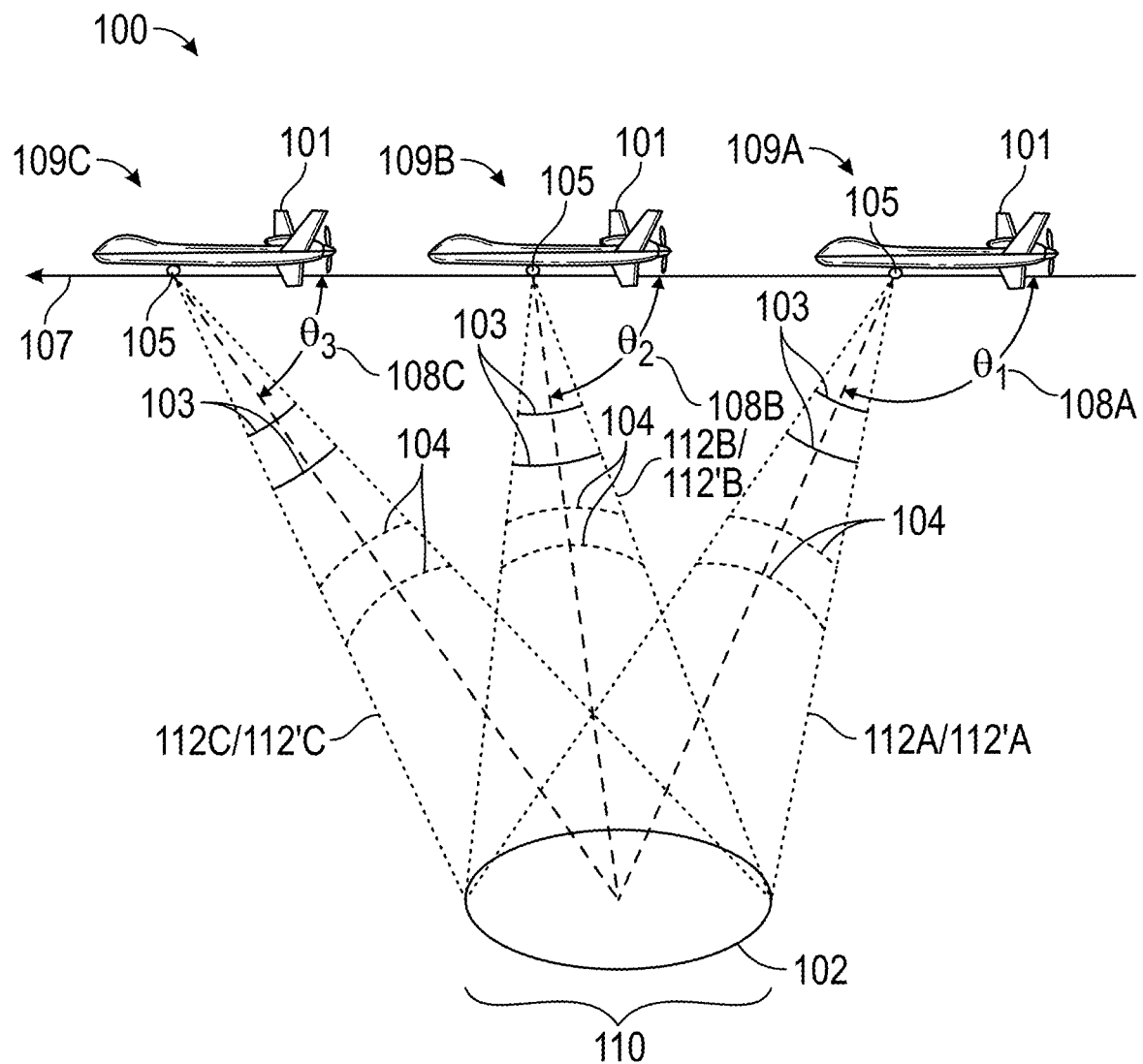
FIG. 1 illustrates a diagram of a spotlight-mode SAR-based navigation system in accordance with one or more embodiments of the disclosure.

FIG. 1 illustrates a diagram of a SAR-based navigation system 100 in accordance with one or more embodiments of the disclosure. In one or more embodiments, SAR-based navigation system 100 is implemented as a spotlight-mode SAR-based navigation system, however, other mode implementations are possible, as described herein. In some embodiments, SAR-based navigation system 100 is mounted on a moving platform such as an aerial vehicle 101, for example, and used to receive radar phase history data 112A-C of a scene 102. Electromagnetic waves 103 are sequentially transmitted and the backscattered waves 104 are collected by a SAR radar system for navigation guidance 105. Consecutive time intervals of radar transmission and reception are used to receive radar phase history data 112A-C of scene 102 at different positions 109A-C along a flight path 107. The combination of received backscattered waves 104 allows construction of a synthetic aperture that is longer than the physical aperture length. Processing the combination of raw radar data (e.g., radar phase history data 112A-C of scene 102) enables the construction of a synthetic aperture radar image 110 (e.g., a high resolution synthetic aperture radar image) of the captured scene 102. However, this invention obviates the need for the construction of the synthetic aperture radar image in order to perform the navigation task, instead estimating the geometric transformation parameters directly from the range profiles of the received phase history data and phase history template data.

In some embodiments, aerial vehicle 101, for example, is flown past or around scene 102 (e.g., a stationary ground location). In one or more embodiments, aerial vehicle 101 is any type of unmanned or manned aerial vehicle, such as a manned aircraft, an unmanned drone, or an orbiting spacecraft, for example. Scene 102 is illuminated with electromagnetic waves 103 that are transmitted by a linear frequency modulated chirp signal, for example, from SAR radar system for navigation guidance 105 (e.g., SAR navigation guidance system 105) mounted to aerial vehicle 101. Backscattered waves 104 are received at SAR navigation guidance system 105 from multiple observation views 108A, 108B, and 108C, for example, and captured as radar phase history data 112A-C, respectively. In some embodiments, phase history data 112A-C of backscattered waves 104 are received at one or more radar frequencies, ranging from one gigahertz to twelve gigahertz, for example.

Figure 2:
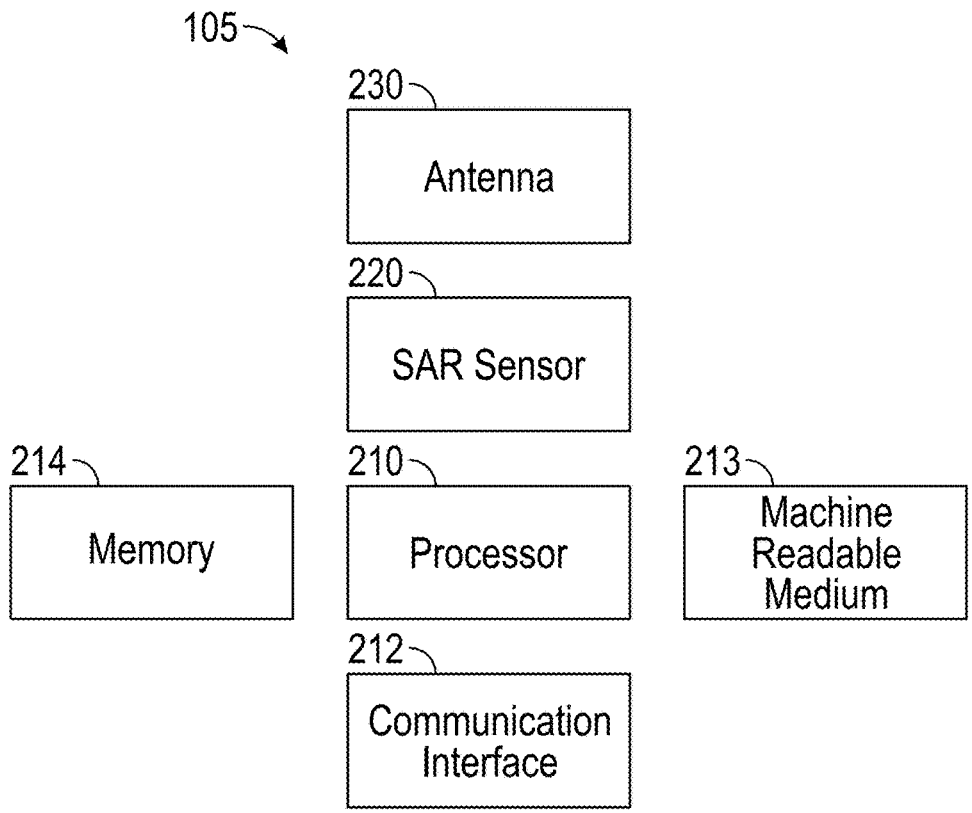
FIG. 2 illustrates a block diagram of a SAR radar system for navigation guidance in accordance with an embodiment of the disclosure.

FIG. 2 illustrates a block diagram of a SAR radar system for navigation guidance 105 in accordance with an embodiment of the disclosure. In some embodiments, SAR navigation guidance system 105 is used to capture and process phase history data 112A-C in accordance with various techniques described herein. In various embodiments, components of SAR navigation guidance system 105 are provided in aerial vehicle 101 implemented as a drone, for example.

In one embodiment, SAR navigation guidance system 105 includes a processor 210, a synthetic aperture radar (SAR) sensor 220, and an antenna 230. In one or more embodiments, SAR navigation guidance system 105 is implemented as a synthetic radar device to capture phase history data 112A-C from observation views 108A-C, for example, of a scene 102 (e.g., a ground location). SAR navigation guidance system 105 represents any type of SAR radar device which transmits and receives electromagnetic radiation and provides representative data in the form of raw radar phase history data 112A-C. In some embodiments, SAR navigation guidance system 105 is implemented to transmit and receive radar energy pulses in one or more frequency ranges from approximately one gigahertz to sixteen gigahertz. However, in other embodiments, other frequencies are possible from frequencies less than one gigahertz to greater than sixteen gigahertz. In some embodiments, SAR navigation guidance system 105 is mounted to a platform of various types of unmanned flying vehicles, such as, for example, a drone or an orbiting spacecraft. In other embodiments, SAR navigation guidance system 105 is mounted to a platform of various types of manned flying vehicles.

Processor 210 includes, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processor 210 is adapted to interface and communicate with memory 214 and SAR sensor 220 via a communication interface 212 to perform method and processing steps as described herein. Communication interface 212 includes wired or wireless communication buses within aerial vehicles described herein.

In various embodiments, it should be appreciated that processing operations and/or instructions are integrated in software and/or hardware as part of processor 210, or code (e.g., software or configuration data) which is stored in a memory 214. Embodiments of processing operations and/or instructions disclosed herein are stored by a machine readable medium 213 in a non-transitory manner (e.g., a memory, a hard drive, a compact disk, a digital video disk, or a flash memory) to be executed by a computer (e.g., logic or processor-based system) to perform various methods disclosed herein. In one or more embodiments, the machine readable medium 213 is included as part of processor 210.

Memory 214 includes, in one embodiment, one or more memory devices (e.g., one or more memories) to store data and information. The one or more memory devices includes various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processor 210 is adapted to execute software stored in memory 214 to perform various methods, processes, and operations in a manner as described herein. In various embodiments, memory 214 stores received phase history data 112A-C of a scene and/or phase history template data 112'A-C of the same scene.

SAR sensor 220, in some embodiments, is used to transmit electromagnetic waves 103 (e.g., radar pulse energy) and receive backscattered waves 104 (e.g., received phase history data 112A-C) of scene 102, for example. SAR sensor 220 includes, in one embodiment, a radar transmitter to produce radar pulses that are provided to an antenna 230 and radiated in space toward scene 102 by antenna 230 as electromagnetic waves 103. SAR sensor 220 further includes a radar receiver to receive backscattered waves 104 from antenna 230. Backscattered waves 104 are received by SAR sensor 220 as received phase history data 112A-C at respective observation angles 108A-C of scene 102. SAR sensor 220 communicates received phase history data 112A-C to processor 210 and/or memory 214 via communication interface 212.

Antenna 230, in some embodiments, is implemented to both transmit electromagnetic waves 103 and receive back-scattered waves 104. In some embodiments, antenna 230 is implemented as a parabolic antenna. In other embodiments, antenna 230 is implemented as a phased array antenna. However, other implementations of antenna 230 are possible.

In one or more embodiments, SAR-based navigation system 100 is implemented using an algorithm for estimating geometric transformations. However, other modes of SAR-based navigation system 100 are possible, as discussed herein. Geometric transformations, such as rotation, translation, and scaling are mapped to the SAR phase history domain and the range profile domain. In this regard, the numerical method converts phase history data 112A-C to a range profile domain for the multiple observation views 108A-C of scene 102 (e.g., observation angles) and SAR phase history template data 112'A-C of the same scene 102 and solves for geometric transformations in the range profile domain.

A classical observation model is provided with the following description and equations. Let f(x,y) be the complex reflectivity profile of the target scene, which is centered at (0,0) with radius L. If the pulse used is a linear frequency modulated (FM) chirp signal provided by equation 1.1

$$s(t)=e^{j(w_0 t + \alpha t^2)}, \text{ for } |t|<T/2 \quad \text{(equation 1.1)}$$

where $\omega_0$ is the carrier frequency and $2\alpha$ is the chirp rate, then the observed signal with viewing angle θ after low-pass filtering is given by equation 1.2:

$$r_\theta(t) = \int\int_{x^2+y^2 \leq L^2} f(x,y) e^{-j\Omega(t)(x\cos\theta+y\sin\theta)} dx dy \quad \text{(equation 1.2)}$$

where $\Omega(t) = \frac{2}{c}(w_0 + 2\alpha t)$.

The filtered back-projection method is an efficient image formation method because it leverages the fast Fourier transform (FFT) by reformulating the observed signal in equation 1.3:

$$r_\theta(t) = \int_{-L}^{L} q_\theta(u) e^{-j\Omega(t)u} du \equiv T q_\theta(u) \quad \text{(equation 1.3)}$$

where $q_\theta(u) = \iint_{x^2+y^2 \leq L^2} f(x,y) \delta(u-x-y) dx dy$ is the projection profile along angle θ. The filtered back-projection method utilizes 1D-FFT and does not require interpolation of the data from the polar grid to the Cartesian grid, as required for the polar format algorithm, a fast method that utilizes 2D FFT.

The effects of geometric transformations on SAR phase history data are derived. In particular, the phase history transformations under scene rotation, scaling, and translation is derived below.

The spotlight-mode SAR phase history formulation can be expressed as a Fourier transform of the range profile (projection profile along an angle). The range profile of the scene f(x,y) (complex-valued reflectivities) along angle θ is the sum of reflectivities at a distance R+u given by equation 1.4:

$$q_\theta(u) = \iint_{x^2+y^2 \leq L^2} f(x,y) \delta(u-x\cos\theta-y\sin\theta) dx dy \quad \text{(equation 1.4)}$$

The phase history data (what the sensor receives) at observation angle θ (e.g., observation view) is given by equation 1.5:

$$r_\theta(t) = \int_{-L}^{L} q_\theta(u) e^{-i\Omega(t)u} du \quad \text{(equation 1.5)}$$

where $$\Omega(t) = \frac{2}{c}(w_0 + 2\alpha(t-\tau_0))$$

is derived from the transmitted pulses that are linear FM chirp signals. T denotes the operator that takes range profiles into phase history formulation:

$$r_\theta(t) = T q_\theta(u).$$

Rotation: If f(x,y) is rotated at an angle ϕ, the sensor receives at the observation angle θ a rotation given by equation 1.6:

$$r_\theta^{rotation} = \int_{-L}^{L} q_{\theta-\phi}(u) e^{-i\Omega(t)u} du = r_{\theta-\phi}(t) \quad \text{(equation 1.6)}$$

Scaling: If f(x,y) is scaled by k, the sensor receives at the observation angle θ a scaling given by equation 1.7:

$$r_\theta^{scale} = k^3 \int_{-L}^{L} q_\theta(u) e^{-i\Omega(t)ku} du \quad \text{(equation 1.7)}$$

To derive this, first let g(x,y)=f(x/k,y/k) be the scaled view of the scene. Substitute $\tilde{x}=x/k$ and $\tilde{y}=y/k$, and the range profile at distance R+u along angle θ is given by equation 1.8:

$$\tilde{q}_\theta(u) = \iint_{\tilde{x}^2+\tilde{y}^2 \leq L^2} f(\tilde{x},\tilde{y}) \delta(u-\tilde{x}\cos\theta-\tilde{y}\sin\theta) k^2 d\tilde{x} d\tilde{y} = k^2 q_\theta(u) \quad \text{(equation 1.8)}$$

Let $\tilde{u}=u/k$. The sensor receives at observation angle θ a scaling given by equation 1.9:

$$\int_{-L \leq \tilde{u} \leq L} k^2 q_\theta(\tilde{u}) e^{-i\Omega(t)k\tilde{u}} k d\tilde{u} = k^3 \int_{-L}^{L} q_\theta(u) e^{-i\Omega(t)ku} du \quad \text{(equation 1.9)}$$

Translation: If f(x,y) is translated by $(x_0,y_0)$, the sensor receives at observation angle θ a translation given by equation 1.10:

$$r_\theta^{translation} = e^{-i\Omega(t)u_{0,\theta}} r_\theta(t) \quad \text{(equation 1.10)}$$

where $u_{0,\theta} = x_0 \cos\theta - y_0 \sin\theta$ is the projection of vector $(x_0, y_0)$ onto the u-axis. To derive this, first let $g(x,y)=f(x-x_0, y-y_0)$. Substitute $\tilde{x}=x-x_0$ and $\tilde{y}=y-y_0$, the range profile at distance R+u along angle θ is given by equation 1.11:

$$\tilde{q}_\theta(u) = \iint_{\tilde{x}^2+\tilde{y}^2 \leq L^2} f(\tilde{x},\tilde{y}) \delta((u-x_0 \cos\theta - y_0 \sin\theta) - \tilde{x}\cos\theta - \tilde{y}\sin\theta) d\tilde{x} d\tilde{y} = q_\theta(u - x_0 \cos\theta - y_0 \sin\theta) = q_\theta(u - u_{0,\theta}) \quad \text{(equation 1.11)}$$

The sensor receives at observation angle θ a translation given by equation 1.12:

$$\int_{-L+u_{0,\theta}}^{L+u_{0,\theta}} q_\theta(u-u_{0,\theta}) e^{-i\Omega(t)u} du = \int_{-L}^{L} q_\theta(u) e^{-i\Omega(t)(u+u_{0,\theta})} du = e^{-i\Omega(t)u_{0,\theta}} r_\theta(t) \quad \text{(equation 1.12)}$$

Combining the three geometric transformations (e.g., Rotation+Scaling+Translation), the sensor receives at observation angle θ (e.g., observation view) a rotation, scaling, and translation given by equation 1.13:

$$r_\theta^{rotation+scale+translation} = k^3 e^{-i\Omega(t)u_{0,\theta}} \int_{-L}^{L} q_{\theta-\phi}(u) e^{-i\Omega(t)ku} du \quad \text{(equation 1.13)}$$

Range profiles can be efficiently reconstructed from the raw phase history data of equation 1.13. The first step of the filtered back-projection utilizes the 1D fast Fourier Transform (FFT) and recovers the range profiles, before reconstructing the image scene. To estimate the unknown geometric transformations, the relation between the phase history data and range profiles are expressed as the following:

Rotation by $\phi$:

$$\int_{-L}^{L} q_{\theta-\phi}(u) e^{-i\Omega(t)u} du \quad \text{(equation 1.14)}$$

Scaled by $k$:

$$k^3 \int_{-L}^{L} q_\theta(u) e^{-i\Omega(t)ku} du \quad \text{(equation 1.15)}$$

Translation by $(x_0, y_0)$:

$$\int_{-L+u_{0,\theta}}^{L+u_{0,\theta}} q_\theta(u - u_{0,\theta}) e^{-i\Omega(t)u} du \quad \text{(equation 1.16)}$$

The following is a SAR registration method operating in the range profile domain. Since rotation and translation can be expressed in the range profiles (scaling causes different spatial frequency: $\Omega(t)k$), range profiles can be efficiently computed via 1D-FFT, and range profiles are approximately sparse, we estimate the unknown rotation and translation in the range profile domain.

Given SAR phase history template $r_{template}(\theta, u)$ and phase history data $r_{observation}(\theta, u)$, the unknown rotation $\phi$ and translation $(x_0, y_0)$ is estimated by the following optimization formula given in equation 1.17:

$$\min_{\phi,(x_0,y_0)} \|T^{-1} r_{observation}(\theta - \phi, u - u_{0,\theta}) - T^{-1} r_{template}(\theta, u)\|^2 \quad \text{(equation 1.17)}$$

In this formulation, $\phi$ is an unknown constant that needs to be estimated, and $u_{0,\theta} = x_0 \cos\theta - y_0 \sin\theta$ is another unknown that depends on the observation angle $\theta$, which in turn requires estimations of two constants, $x_0$ and $y_0$. An algorithm, as described further herein, is used to solve for the unknown rotation $\phi$ and translation $(x_0, y_0)$.

Figure 3:
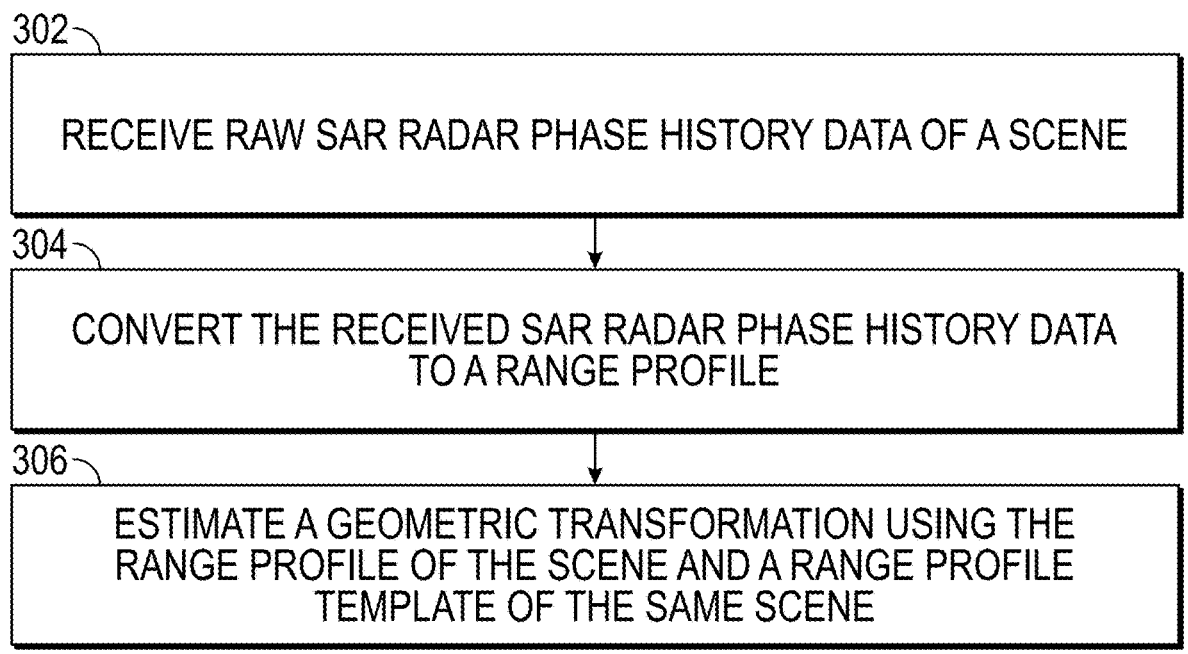
FIG. 3 illustrates a flow diagram describing a method for estimating geometric transformations of a scene encoded in the received phase history data with respect to a reference template in accordance with an embodiment of the disclosure.

FIG. 3 illustrates a flow diagram describing a method for estimating geometric transformations of a scene encoded in the received phase history data with respect to a reference template in accordance with an embodiment of the disclosure. The method described is an efficient method for matching and registration of synthetic aperture radar phase history data of a scene with phase history template data of the same scene. Significantly, SAR phase history data provides pixel information sufficient to enable SAR-based navigation without the need for computationally intensive SAR image reconstruction and feature detection. In this regard, both received phase history data 112A-C of the scene and phase history template data 112'A-C of the same scene are approximately sparse (e.g., include a minimum number of non-zero pixel values). Both received phase history data of the scene and template data of the same scene are mapped from the phase history domain to the range profile domain for computing estimates of geometric transformations such as rotation, translation, and scaling.

In block 302, SAR-based navigation system 100, operating in a spotlight-mode, for example, in this illustrative embodiment, receives backscattered waves 104 from scene 102 at associated observation views 108A, 108B, and 108C to provide different projections of scene 102. It is understood SAR-based navigation system can operate in one or more modes, such as, for example, strip map, scan, spotlight, or other modes applicable to SAR-based navigation. Backscattered waves 104 are processed by SAR sensor 220 and received by processor 210 as phase history data 112A-C of scene 102 that include phase history data $r_{obs}(\theta, u)$.

In block 304, phase history data $r_{obs}(\theta, u)$ for at least one of the observation views 108A-C of scene 102 is received by processor 210. Received phase history data 112A-C is converted from the phase history domain to a range profile domain. For example, in spotlight-mode SAR, a reconstruction method is to convert phase history data $r_{obs}(\theta, u)$ to a range profile $q_{obs}(\theta, u)$ using a 1D-fast Fourier transform (e.g., 1D-FFT), followed by a Radon transform. The relation between phase history data $r_{obs}(\theta, u)$ and range profile $q_{obs}(\theta, u)$ with respect to geometric transformations of scene 102 is provided by three equations. Equation 1.14 (e.g., $\int_{-L}^{L} q_{\theta-\phi}(u) e^{-i\Omega(t)u} du$) provides the relation between phase history data and range profile under scene rotation angle $\phi$. Equation 1.15 (e.g., $k^3 \int_{-L}^{L} q_\theta(u) e^{-i\Omega(t)ku} du$) provides the relation between phase history data and range profile scale factor k. Equation 1.16 (e.g., $\int_{-L+u_{0,\theta}}^{L+u_{0,\theta}} q_\theta(u) - u_{0,\theta}) e^{-i\Omega(t)ku} du$) provides the relation between phase history data and range profile translation value $(x_o, y_o)$.

In block 306, an algorithm (e.g., illustrated as algorithm 400 in FIG. 4) is used to estimate a geometric transformation of scene 102 using the range profile data of block 304 and a SAR range profile template of the same scene 102. In some embodiments, SAR range profile template of scene 102 includes a minimum number of non-zero values (e.g., SAR range profile template data of scene 102 is approximately sparse). Each SAR template includes phase history data and is pre-stored in memory 214 as SAR phase history template data 112'A-C, for example. SAR phase history template data $r_{temp}(\theta, u)$ is converted to a SAR range profile template $q_{temp}(\theta, u)$ using a 1D-fast Fourier transform (e.g., 1D-FFT). In some embodiments, SAR range profile template $q_{temp}(\theta, u)$ is stored in memory 214.

The range profile domain is used to efficiently estimate unknown rotation angle $\phi$ and translation value $(x_o, y_o)$, where the rotation angle $\phi$ and translation value $(x_o, y_o)$ form a part of the estimated geometric transformation. The unknown rotation angle $\phi$ and translation value $(x_o, y_o)$ are solved for using equation 1.17 and algorithm 400 as discussed in FIG. 4. In this regard, the estimated geometric transformation (e.g., rotation angle $\phi$ and translation value $(x_o, y_o)$) of at least one view (e.g., at least one observation view 108A-C) of scene 102 encoded in the received phase history data 112A-C with respect to a reference phase history template data 112'A-C of the same scene 102 is computed and stored in memory 214.

Figure 4:
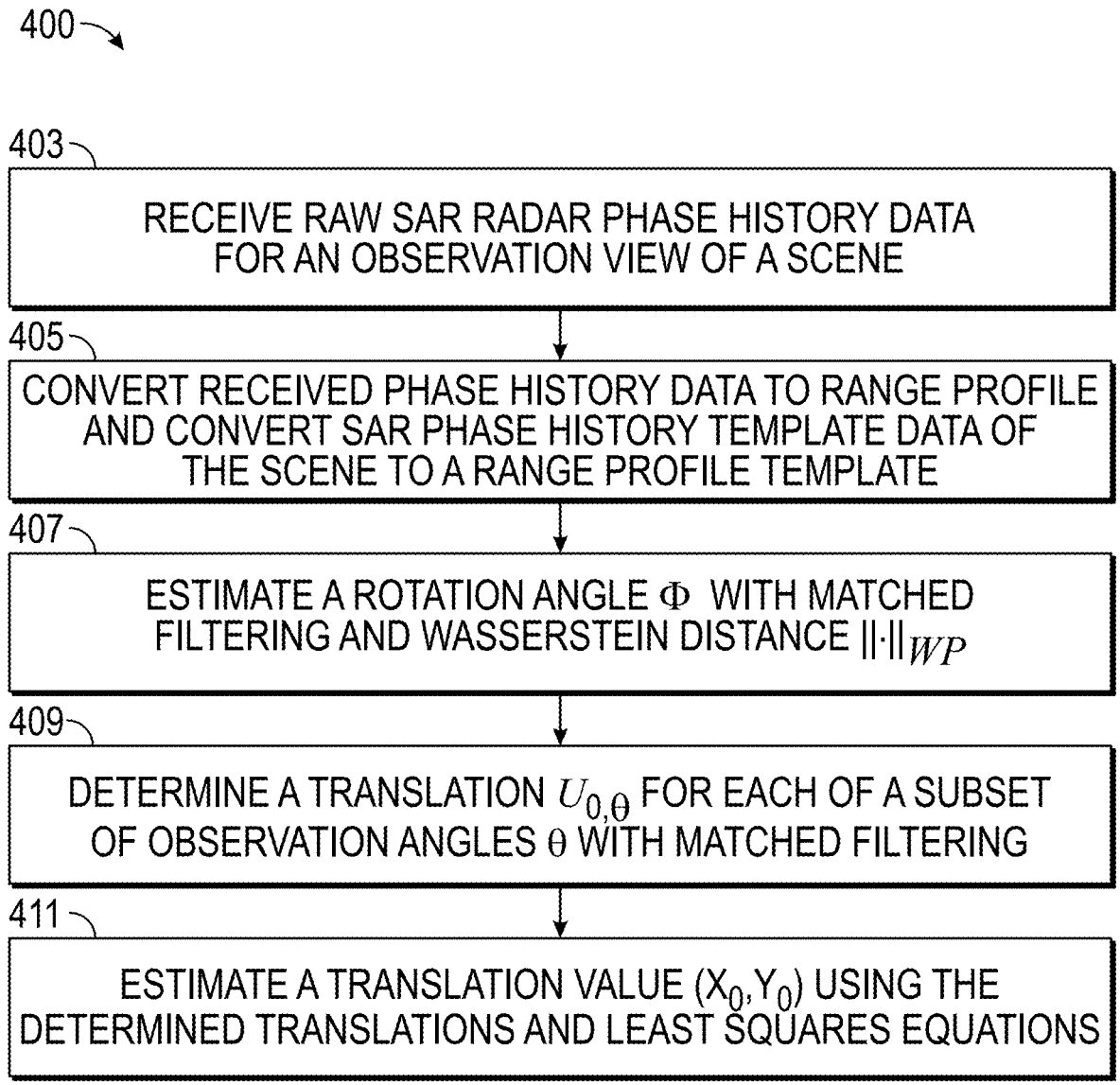
FIG. 4 illustrates a flow diagram describing an algorithm for estimating geometric transformations of a scene encoded in the received phase history data with respect to a reference template in accordance with an embodiment of the disclosure.

FIG. 4 illustrates a flow diagram describing algorithm 400 for estimating geometric transformations of a scene encoded in the received phase history data with respect to a reference template in accordance with an embodiment of the disclosure. Algorithm 400, used for finding the rotation angle, and translation between SAR phase history template data 112'A-C and received radar phase history data 112A-C, starts with block 403.

In block 403, phase history data $r_{obs}(\theta, u)$ captured at an observation view 108 is received from a SAR sensor 220. Only limited phase history data of scene 102 is required to support estimating geometric transformations. These result in less memory and computational complexity required to execute algorithm 400. In this regard, in some embodiments, a limited subset of raw radar phase history data 112 of scene 102 is collected. In other embodiments, a complete set of raw radar phase history data 112 of scene 102 (e.g., a complete radar image of scene 102) are collected and a subset of rows are chosen from the complete set of received phase history data 112 to support execution of algorithm 400.

In block 405, a 1D fast Fourier Transform (FFT) is applied to the observed phase history data $r_{obs}(\theta, u)$ and a phase history template $r_{temp}(\theta, u)$ that is retrieved from memory 214. The FFT of the phase history data generates respective range profile $q_{obs}(\theta,u)$ and range profile template $q_{temp}(\theta,u)$.

In blocks 407-411, equation 1.17 is used to solve for an unknown rotation angle $\phi$ and an unknown translation value $(x_o,y_o)$, where $u_{0,\theta}=x_0 \cos \theta - y_0 \sin \theta$. In block 407, a translation $u_{0,\theta}$ value is fixed, and an optimal rotation angle $\phi$ is determined with matched filtering and a Wasserstein distance $\|\cdot\|_{w_p}$ using equation 2.1.

$$\min_\phi \|q_{obs}^{sub}(\theta - \phi, u - u_{0,\theta}) - q_{temp}^{sub}(\theta, u)\|_{w_p} \quad \text{(equation 2.1)}$$

The rows of the range profile can be very sparse and consist of a few spikes that resemble probability distributions. The Wasserstein distance is a suitable measure for comparing probability distributions because it takes into account the distance between sparse spikes by taking the difference of the cumulative sparse distributions.

In block 409, a rotation angle $\phi$ is fixed, and an optimal translation $u_{0,\theta}$ is determined for each of a subset of observation angles $\theta$ (e.g., observation views $\theta_1$ through $\theta_3$, for example) with matched filtering. In block 411, a translation value $(x_o,y_o)$ is then determined using a system of linear equations with least squares as given in equation 2.2.

$$\begin{cases} \cos\theta_1 x_0 - \sin\theta_1 x_0 = u_{\theta_1} \\ \cos\theta_2 x_0 - \sin\theta_2 x_0 = u_{\theta_2} \\ \vdots \\ \cos\theta_n x_0 - \sin\theta_n x_0 = u_{\theta_n} \end{cases} \quad \text{(equation 2.2)}$$

In this regard, algorithm 400 provides for a flexible and efficient matching and registration numerical method for estimating geometric transformations such as rotation angle $\phi$ and translation value $(x_o,y_o)$ used in SAR-based navigation system 100. Comparing a range profile of the scene to a range profile template of the same scene provides for a computationally efficient method of estimating a geometric transformation of the scene encoded in the received phase history data with respect to a reference template.

Figure 5A:
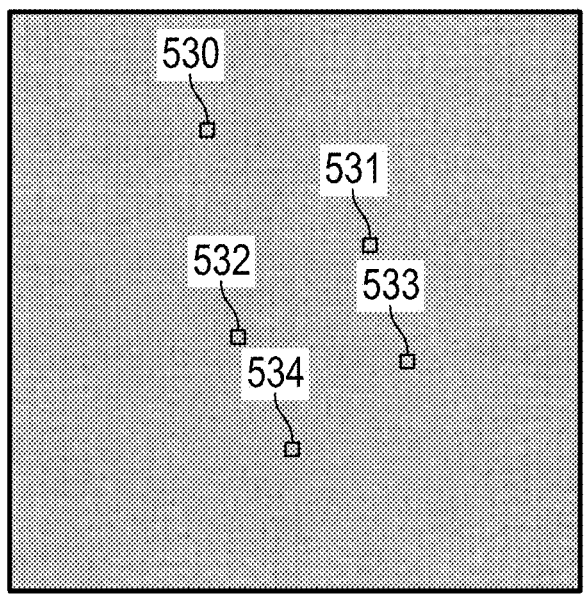
FIGS. 5A-D illustrate graphs of SAR phase history data and range profiles in accordance with embodiments of the disclosure.
Figure 5B:
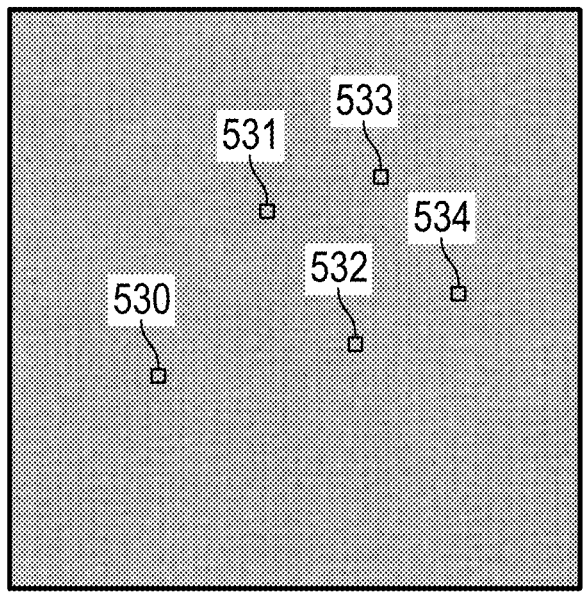

FIGS. 5A-D illustrate graphs of SAR phase history data and range profiles, as illustrative examples, in accordance with embodiments of the disclosure. FIG. 5A illustrates a two thousand by two thousand pixels simulation of an image of a template for a scene with five small objects 530-534, each providing features that can be matched and are sparsely distributed within the scene. FIG. 5A phase history template data was simulated with four hundred twenty four (424) frequencies and three hundred sixty (360) by one hundred seventeen (117) angles of observation. FIG. 5B illustrates a simulated observed phase history data for a transformed scene including the same five small objects 530-534 with a rotation and translation. In the example, FIG. 5B was rotated by ninety degrees and translated by $x_o$=one hundred pixels and $y_o$=twenty pixels, representing actual geometric transformations.

Figure 5C:
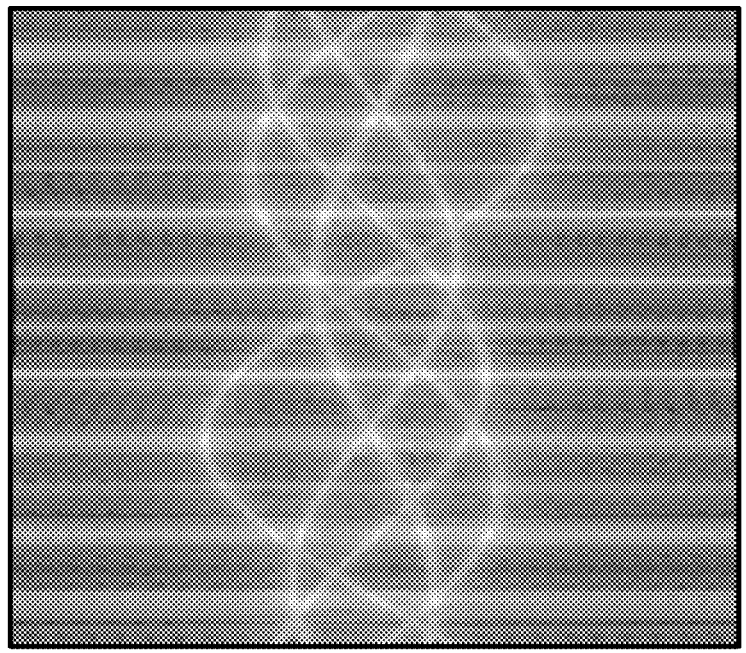
Figure 5D:
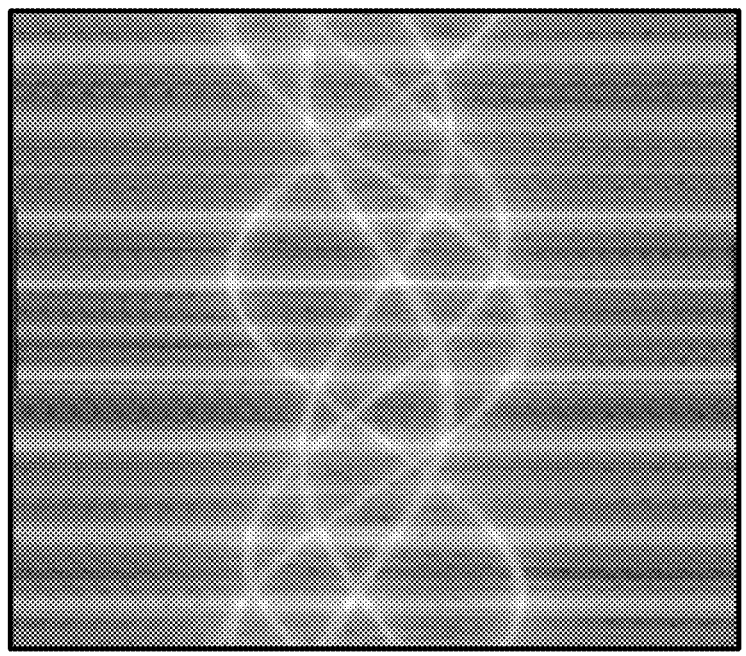

FIG. 5C illustrates a respective range profile of FIG. 5A SAR phase history template data. Each of small objects 530-534 of FIG. 5A corresponds to a sinusoidal shape in FIG. 5C. FIG. 5D illustrates a respective range profile of FIG. 5B observed phase history data. FIG. 5D illustrates that each of the sinusoidal shapes have changed shape when small objects 530-534 have shifted as shown in FIG. 5B.

Algorithm 400 was implemented with ten randomly chosen range profile row vectors to estimate the rotation angle $\phi$ and ten randomly chosen range profile column vectors to estimate the translation value $(x_o,y_o)$, representing an under-sampling by a factor of one hundred seventy five (175) times.

The estimate using algorithm 400 for the rotation angle estimate was ninety degrees, identical to expected. The solution for the translation value $(x_o,y_o)$ was approximately $x_o$=ninety nine and sixty eight one hundredths (99.68) pixels and $y_o$=nineteen and sixty nine one hundredths (19.69) pixels, representing a small relative error of less than one pixel. As illustrated, algorithm 400 achieves near exact estimation of the unknown translation and rotation angle parameters without the need for image reconstruction and feature detection. Estimation of the unknown translation and rotation angle parameters is performed by under-sampling the observation SAR phase history data by a factor of one hundred seventy five (175). Advantageously, under-sampling requires less computational complexity and resources to perform algorithm 400 and makes possible SAR-based navigation on autonomous platforms with limited computational power and resources, such as aerial vehicle 101.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable media. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:
1. A method for synthetic aperture radar (SAR) mapping and registration to aid in SAR-based navigation, the method comprising:
transmitting electromagnetic waves at a scene remote from a SAR system;
receiving SAR phase history data of backscattered waves associated with observation views of the scene;
converting the received SAR phase history data associated with observation views to a range profile of the scene; and
comparing the range profile to a range profile template of the scene to estimate a geometric transformation of the scene encoded in the received SAR phase history data with respect to a reference template.

2. The method of claim 1, further comprising:
estimating a rotation angle of the range profile using matched filtering and a Wasserstein distance;
wherein the rotation angle forms a part of the estimated geometric transformation.

3. The method of claim 1, further comprising:
receiving an observation angle corresponding to each of the observation views of the scene; and
storing the observation angles in a memory.

4. The method of claim 3, further comprising:
selecting a subset of the observation angles; and
estimating a translation value of the range profile using the selected subset of observation angles, matched filtering, and linear equations with least squares;
wherein the translation value forms a part of the estimated geometric transformation.

5. The method of claim 1, wherein the receiving comprises receiving the SAR phase history data associated with the observation views of the scene from a SAR sensor.

6. The method of claim 1, wherein the converting the received SAR phase history data to the range profile comprises using a fast Fourier transform algorithm.

7. The method of claim 1, further comprising storing the estimated geometric transformation in a memory.

8. A method for synthetic aperture radar (SAR) mapping and registration to aid in SAR-based navigation, the method comprising:
transmitting electromagnetic waves at a scene remote from a SAR system;
retrieving SAR phase history template data of backscattered waves associated with observation views of a scene from a memory, wherein the backscattered waves were produced by the electromagnetic waves transmitted at the scene;
converting the SAR phase history template data to a range profile template of the scene; and
storing the range profile template to the memory.

9. The method of claim 8, wherein the retrieving comprises retrieving a subset of SAR phase history template data from a plurality of SAR phase history template data of the scene.

10. The method of claim 8, wherein the converting the SAR phase history template data to the range profile template comprises using a fast Fourier transform algorithm.

11. The method of claim 8, wherein the SAR phase history template data comprises a minimum number of non-zero pixel values.

12. A system for synthetic aperture radar (SAR) mapping and registration to aid in SAR-based navigation, the system comprising:

a SAR system configured to transmit electromagnetic waves at a scene remote from the SAR system and receive backscattered waves associated with observation views of the scene;
a memory comprising a plurality of executable instructions; and
a processor adapted to:
receive SAR phase history data associated with the backscattered waves associated with the observation views of the scene;
convert the received SAR phase history data associated with observation views to a range profile of the scene; and
compare the range profile to a range profile template of the scene to estimate a geometric transformation of the scene encoded in the received SAR phase history data with respect to a reference template.

13. The system of claim 12, wherein the processor is configured to estimate a rotation angle of the range profile using matched filtering and a Wasserstein distance, and wherein the rotation angle forms a part of the geometric transformation.

14. The system of claim 12, wherein each of the observation views corresponds to an associated observation angle, and wherein the observation angles are stored in the memory.

15. The system of claim 14, wherein the processor is configured to select a subset of the observation angles and estimate a translation value of the range profile of the scene using the selected subset of observation angles with matched filtering and linear equations with least squares, and wherein the translation value forms a part of the geometric transformation.

16. The system of claim 12, further comprising an aerial vehicle comprising an antenna and a SAR sensor.

17. The system of claim 16, wherein the antenna is configured to transmit radar pulse energy toward the scene and receive backscattered radar pulse energy reflected from the scene.

18. The system of claim 17, wherein the SAR sensor is configured to provide a plurality of radar pulses to the antenna and receive the backscattered radar pulse energy from the antenna to capture the SAR phase history data of the scene.

19. The system of claim 12, wherein the SAR phase history data comprises a minimum number of non-zero pixel values.

20. The system of claim 12, wherein the SAR phase history data, the range profile, the range profile template and the geometric transformation are stored in the memory.

* * * * *